United States Patent [19]

Takara et al.

[11] Patent Number: 5,376,871

[45] Date of Patent: Dec. 27, 1994

[54] METHOD OF CONTROLLING POSITION OF ROTARY SHAFT IN MAGNETIC BEARING

[75] Inventors: Akira Takara, Higashiosaka; Toru Nakagawa, Hirakata; Masakazu Nakashima, Osaka, all of Japan

[73] Assignee: Matsushita Electric Industrial Co., Ltd., Osaka, Japan

[21] Appl. No.: 956,645

[22] Filed: Oct. 2, 1992

[30] Foreign Application Priority Data

Oct. 4, 1991 [JP] Japan .................. 3-257559
May 14, 1992 [JP] Japan .................. 4-121597

[51] Int. Cl.$^5$ .............................. G05B 11/42
[52] U.S. Cl. ...................... 318/610; 318/115; 318/632
[58] Field of Search .............. 318/610, 115, 632

[56] References Cited

U.S. PATENT DOCUMENTS 4,879,500 11/1989 Kanemitsu .................. 318/632
4,908,558  3/1990 Lordo et al. ................ 318/115

Primary Examiner—William M. Shoop, Jr.
Assistant Examiner—Karen Masih
Attorney, Agent, or Firm—Ratner & Prestia

[57] ABSTRACT

In a magnetic bearing carrying a rotary shaft in the air, the rotary shaft is required to rotate substantially at the same position. In controlling the position of the rotary shaft, a first exciting current $I_f$ is supplied to a plurality of first electric magnets formed in the proximity of one end of the rotary shaft, whereas a second exciting current $I_r$ is supplied to a plurality of second electric magnets formed in the proximity of the other end of the rotary shaft. The first exciting current $I_f$ is represented by the sum of a first biasing current $\bar{I}_f$, a first control current $i_{Hf}$ for translation, and a first control current $i_{Kf}$ for rotary motion. The second exciting current $I_r$ is represented by the sum of a second biasing current $\bar{I}_r$, a second control current $i_{Hr}$ for translation, and a second control current $i_{Kr}$ for rotary motion. Under such conditions, a ratio $\bar{I}_f/\bar{I}_r$ between the first and second biasing currents, a ratio $i_{Hf}/i_{Hr}$ between the first and second control currents for the translation, and a ratio $i_{Kf}/i_{Kr}$ between the first and second control currents for the rotary motion are appropriately determined so as not to cause a mutual interference between the translation and the rotary motion of the rotary shaft.

4 Claims, 4 Drawing Sheets

METHOD OF CONTROLLING POSITION OF ROTARY SHAFT IN MAGNETIC BEARING

BACKGROUND OF THE INVENTION

1. Field of the Invention

The present invention relates to a method of controlling the position of a rotary shaft in a magnetic bearing.

2. Description of the Prior Art

Because the magnetic bearing carries a rotary member in the air by the magnetic force without requiring physical contact, the magnetic bearing is characterized in that no problem is encountered in lubrication, it can be used in a specific environment, for example under vacuum, the bearing loss is small, the noise is small, and little maintenance is required. By taking advantage of these features, the magnetic bearing is frequently used in a high-speed processing machine or a vacuum pump.

FIG. 1 depicts a conventional magnetic bearing having a shell 11 securely mounted on, for example, a processing machine (not shown). Inside the shell 11 are mounted a rotary shaft 20, a motor stator 12, a plurality of electric magnets 13$a$1–13$a$4 (only 13$a$1 and 13$a$3 are shown), 13$b$1–13$b$4 (only 13$b$1 and 13$b$3 are shown), and 14, and a plurality of displacement detection sensors 15$a$, 15$b$, and 16 for detecting the position of the rotary shaft 20. Two electromagnetic attraction members 18$a$ and 18$b$ are securely mounted on the rotary shaft 20 so as to confront the electric magnets 13$a$1–13$a$4 and the electric magnets 13$b$1–13$b$4, respectively. Each of the electromagnetic attraction members 18$a$ and 18$b$ is made of silicon steel plates laminated one upon another. An electromagnetic attraction member 19 made of steel is securely mounted on or integrally formed with the rotary shaft 20 so that the electric magnets 14 may confront a peripheral portion of the attraction member 19. The position of the rotary shaft 20 is maintained by the attraction members 18$a$ and 18$b$ and the electric magnets 13$a$1–13$a$4 and 13$b$1–13$b$4 in the radial direction, and by the attraction member 19 and the electric magnets 14 in the axial direction.

FIG. 2 depicts a conventional control system for controlling the radial position of the rotary shaft 20. The control system performs a feedback control to change the magnetic attraction of the electric magnets 13$a$1–13$a$4, 13$b$1–13$b$4, and 14, thereby maintaining the rotary shaft 20 substantially at the same position in the air. More specifically, the system controls the radial position of the rotary shaft 20 so that the spacing D, detected by the sensors 15$a$ and 15$b$, between the rotary shaft 20 and the sensors 15$a$ and 15$b$ may be in agreement with the present value D2. As shown in FIG. 2, each set of the electric magnets 13$a$1–13$a$4 and the electric magnets 13$b$1–13$b$4 is independently controlled by a PID regulator 21 via respective control current gains 22. In FIG. 2, the electric magnets 14 for controlling the axial position of the rotary shaft 20 are omitted for brevity's sake.

In the above-described independent control of the electric magnets, however, a mutual interference occurs in magnetic attraction and interrupts the steady support of the rotary shaft 20 in the air.

The mutual interference in magnetic attraction is discussed hereinafter with reference to FIG. 3, wherein a coordinate system is defined with the position of the center of gravity G of the rotary shaft as the origin. The gravity is neglected for brevity's sake. Equations of motion of the rotary shaft are as follows.

$$m\ddot{x} = F_1 - F_3 + F_5 - F_7 \quad \text{(Equation of translation in X-direction)}$$

$$m\ddot{y} = F_2 - F_4 + F_6 - F_8 \quad \text{(Equation of translation in Y-direction)}$$

$$J_r \ddot{\theta}_x + J_a \omega \dot{\theta}_y = -(F_2 - F_4)l_f + (F_6 - F_8)l_r \quad \text{(Equation of rotation in } \theta_x\text{-direction)}$$

$$J_r \ddot{\theta}_x + J_a \omega \dot{\theta}_y = (F_1 - F_3)l_f + (F_5 - F_7)l_r \quad \text{(Equation of rotation in } \theta_y\text{-direction)} \quad (1)$$

where
- m: mass of rotary shaft,
- $F_n$: attraction of each electric magnet (N=1–8),
- $J_r$: moment of inertia of rotary shaft about Z-axis,
- $J_a$: moment of inertia of rotary shaft about X-axis or Y-axis,
- $\omega$: angular velocity of rotary shaft,
- $l_f$: distance between the center of gravity and front electric magnets, and
- $l_r$: distance between the center of gravity and rear electric magnets.

It is to be noted here that, in FIG. 3, the left-hand side is the front side of the magnetic bearing.

The attraction $F_n$ of each electric magnet is given by:

$$F_n = \frac{K_n I_n^2}{D_n^2} \quad (2)$$

where
- $I_n$: exciting current, $I_n = \bar{I}_n + i$
- $D_n$: spacing between electric magnets and rotary shaft, $D_n = \bar{D}_n + d$ and
- $K_n$: constant determined from the property of each electric magnet.

Because the amount of change i of I and the amount of change d of D are very small relative to $\bar{I}$ and $\bar{D}$ in the equilibrium condition, terms of $i/\bar{I}$ and $d/\bar{D}$ having an exponent of 2 or greater are neglected. In this case, the attraction $F_n$ of each electric magnet is expanded as follows:

$$F_n = \overline{F_n} + K_{In} i_n - K_{Dn} d_n \quad (3)$$

$$\overline{F_n} = \frac{K_n \overline{I_n}^2}{\overline{D_n}^2}$$

$$K_{In} = \frac{2 K_n \overline{I_n}}{\overline{D_n}^2}$$

$$K_{Dn} = \frac{2 K_n \overline{I_n}^2}{\overline{D_n}}$$

Let the property K and the spacing D associated with the front four electric magnets be the same and let those associated with the rear four electric magnets be the same. When the variables $I_n$, $D_n$, $K_n$, $K_{In}$, and $K_{Dn}$ associated with each electric magnet is represented by a variable $\phi_n$, $\phi_f = \phi_1 \sim \phi_4$ and $\phi_r = \phi_5 \sim \phi_8$ hold. It is to be noted that subscripts f and r indicate the front side and the rear side, respectively. When a control current i flowing in one electric magnet is rendered to be the same in magnitude as that flowing in another electric magnet opposed thereto with plus and minus reversed, the relationships of $i_4 = -i_2$ and $i_3 = -i_1$ hold, where $i_1$, $i_2$, $i_3$, and $i_4$ are the control currents flowing in the electric magnets $13a1$, $13a2$, $13a3$, and $13a4$, respectively. In this case, the equations of motion of the rotary shaft can be simplified as follows.

$m\ddot{x} - A_1 x - A_2 \theta_y = B_x$ (Equation of translation in X-direction)

$m\ddot{y} - A_1 y + A_2 \theta_x = B_y$ (Equation of translation in Y-direction) (4)

$A_1 = 2(K_{Df} + K_{Dr})$
$A_2 = 2(K_{Df} l_f - K_{Dr} l_r)$
$B_x = 2(K_{If} i_{fx} + K_{If} i_{rx})$
$B_y = 2(K_{If} i_{fy} + K_{If} i_{ry})$ $J_r \ddot{\theta}_x + J_a \omega \dot{\theta}_y - A_3 \theta_x + A_4 y = C_x$ (Equation of rotation in $\theta_x$-direction)

$J_r \ddot{\theta}_y + J_a \omega \dot{\theta}_x - A_3 \theta_y + A_4 x = C_y$ (Equation of rotation in $\theta_y$-direction) (5)

$A_3 = 2(K_{Df} l_f^2 + K_{Dr} l_r^2)$
$A_4 = 2(K_{Df} l_f - K_{Dr} l_r)$
$C_x = -2(K_{If} l_f i_{fy} - K_{Ir} l_r i_{ry})$
$C_y = 2(K_{If} l_f i_{fx} - K_{Ir} l_r i_{rx})$

The equation of translation in the X-direction includes a rotational component $\theta y$ at the third term of the left side thereof, whereas the equation of translation in the Y-direction includes a rotational component $\theta x$ at the third term of the left side thereof. The equation of rotary motion in the $\theta x$-direction includes a rotational component $\theta y$ (gyro effect) and a translation component $y$ at the second and fourth terms of the left side thereof, respectively. When the rotary shaft is long and slender, the moment of inertia $J_a$ is small, and when the angular velocity $\omega$ is small, the influence of the gyro effect can be neglected. Accordingly, the interference is caused only by the translation component $y$. Similarly, the equation of rotary motion in the $\theta y$-direction includes a translation component $x$ in the left side thereof. Because of this, the mutual interference is caused among all of the equations of translation and those of rotary motion.

To solve this problem, another control system has hitherto been proposed wherein four front electric magnets and four rear electric magnets are controlled as one system by separating the attitude of the rotary shaft into the translation components and the rotational components. In this system, the control current i indicated in the right sides of Equations (4) and (5) is constituted by the sum of a control current $i_H$ of the translation and a control current $i_K$ of the rotary motion. When the current value $i_n$ in the right side of Equation (4) corresponding to the controlled variable is changed so that the displacement of the center of gravity may become 0 to satisfy the equation of translation, the values of C in the right sides of Equation (5) also change. As a result, the angle of displacement about the center of gravity changes. Likewise, when the current value $i_n$ in the right side of Equation (5) corresponding to the controlled variable is changed so that the angle of displacement about the center of gravity may become 0 to satisfy the equation of rotary motion, the values of B in the right sides of Equation (4) also change. As a result, the position in the direction of translation changes, and a problem of mutual interference is encountered, which differs from the aforementioned mutual interference caused by the property $K_D$ of each electric magnet and the biasing current $\bar{I}$. Although it is generally known that the use of a technique on the basis of the modern control theory is suited in controlling such a multiinput-multioutput system with accuracy, this kind of technique includes a problem in that the determination of parameters or the calculation are too complicated to be practical.

SUMMARY OF THE INVENTION

The present invention has been developed to overcome the above-described disadvantages.

It is accordingly an object of the present invention to provide an improved method of controlling the position of a rotary shaft in a magnetic bearing, which method is capable of removing a mutual interference between the translation and the rotary motion of the rotary shaft by appropriately determining the biasing current and the ratio between a control current gain of front electric magnets and that of rear electric magnets.

In accomplishing the above and other objects, a first exciting current $I_f$ is supplied to a plurality of first electric magnets formed in the proximity of one end of the rotary shaft, whereas a second exciting current $I_r$ is supplied to a plurality of second electric magnets formed in the proximity of the other end of the rotary shaft. The first exciting current $I_f$ is represented by the sum of a first biasing current $\bar{I}_f$, a first control current $i_{Hf}$ for translation, and a first control current $i_{Kf}$ for rotary motion. The second exciting current $I_r$ is represented by the sum of a second biasing current $\bar{I}_r$, a second control current $i_{Hr}$ for translation, and a second control current $i_{Kr}$ for rotary motion. Under such conditions, a ratio $\bar{I}_f/\bar{I}_r$ between the first and second biasing currents, a ratio $i_{Hf}/i_{Hr}$ between the first and second control currents for the translation, and a ratio $i_{Kf}/i_{Kr}$ between the first and second control currents for the rotary motion are appropriately determined so as not to cause a mutual interference between the translation and the rotary motion of the rotary shaft.

BRIEF DESCRIPTION OF THE DRAWINGS

The above and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Referring again to Equations (4) and (5), because the interference between the translation component x and the rotational component $\theta y$ is equivalent to that between the translation component y and the rotational component θx, only the latter is discussed hereinafter for brevity's sake.

Figure 4:
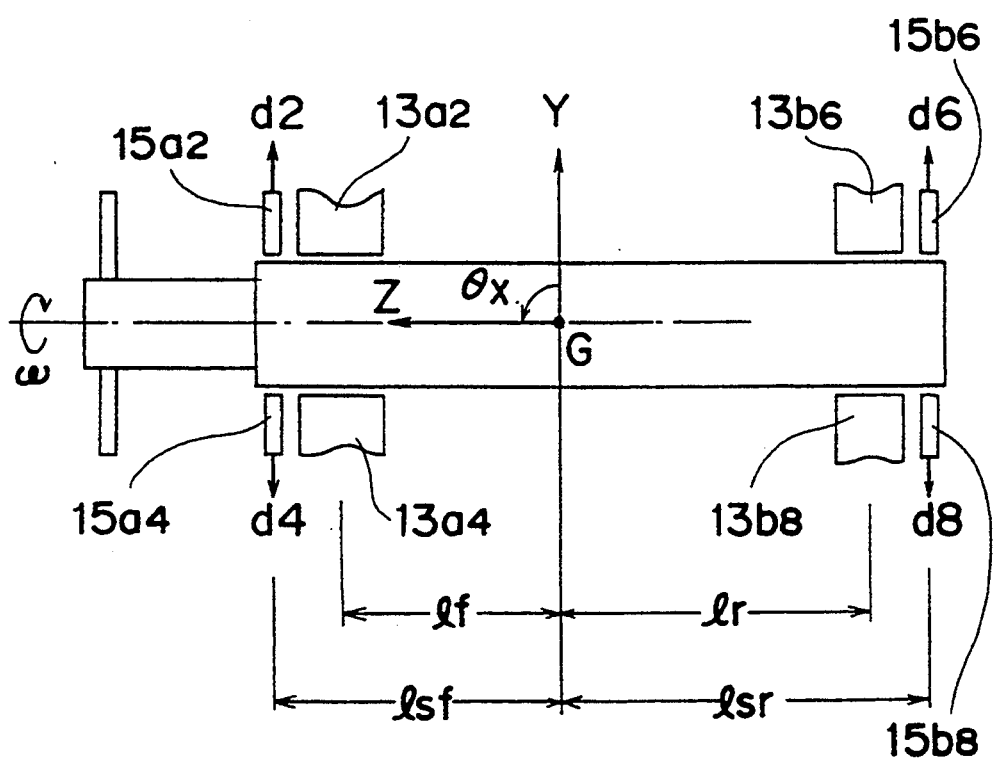
FIG. 4 is a schematic view of a coordinate system having two degrees of freedom.

FIG. 4 depicts a coordinate system having two degrees of freedom of y and θx. Equations of motion of this system are as follows.

$$m\ddot{y} - A_1 y + A_2 \theta_x = B_y \quad (6)$$

$A_1 = 2(K_{Df} + K_{Dr})$
$A_2 = 2(K_{Df}l_f - K_{Dr}l_r)$
$B_y = 2(K_{If}i_f + K_{Ir}i_r)$ $$J_r \ddot{\theta}_x + J_a \omega \dot{\theta}_y - A_3 \theta_x + A_4 y = C_x \quad (7)$$

$A_3 = 2(K_{Df}l_f^2 + K_{Dr}l_r^2)$
$A_4 = 2(K_{Df}l_f - K_{Dr}l_r)$
$C_x = -2(K_{If}l_f i_f - K_{Ir}l_r i_r)$

In order to make the rotary motion exert no influence upon the translation, it is sufficient if the coefficient $A_2$ of the rotational component θx contained in Equation (6) is made 0. Accordingly, $K_{Df}l_f = K_{Dr}l_r$ is a condition for non-interference, and it is apparent from Equation (3) that $K_D$ is determined by the biasing current $\bar{I}$. Likewise, in order to make the translation exert no influence upon the rotary motion, it is sufficient if the coefficient $A_4$ of y of the fourth term in the left side of Equation (7) is made 0. Hereupon, it can be readily understood that the condition of $A_2=0$ and that of $A_4=0$ are satisfied simultaneously. Accordingly, one of the conditions for non-interference between the translation and the rotary motion is such that the biasing current $\bar{I}_f$ of the front electric magnets and the biasing current $\bar{I}_r$ of the rear electric magnets must satisfy a condition of $\bar{I}_f^2 K_r l_f = \bar{I}_r^2 K_r l_r$.

Subsequently, discussion is made with respect to a technique for preventing a control variable in the right side of Equation (6) and that in the right side of Equation (7) from exerting influence one upon another. The control variable of the former varies to control the translation of the center of gravity, whereas that of the latter varies to control the rotary motion about the center of gravity. In Equations (6) and (7), the control current $i_f$ at the front portion of the rotary shaft is expressed by the sum of the control current $i_{Hf}$ of the translation and the control current $i_{Kf}$ of the rotary motion, whereas the control current $i_r$ at the rear portion of the rotary shaft is expressed by the sum of the control current $i_{Hr}$ of the translation and the control current $i_{Kr}$ of the rotary motion.

In order to make the control currents $i_{Hf}$ and $i_{Hr}$ of the translation not interfere with the rotary motion, current gains should be determined such that $C_x$ in the right side of Equation (7) does not change even if $B_y$ in the right side of Equation (6) changes. More specifically, because it is sufficient if the control current is caused to flow so as to satisfy $C_x$, the ratio between control current gains of the translation is determined such that the ratio between the control current $i_{Hf}$ flowing in the front electric magnets and the control current $i_{Hr}$ flowing in the rear electric magnets becomes $i_{Hf}/i_{Hr} = K_{Ir}l_r/(K_{If}l_f)$. Likewise, in order to make the control current $i_K$ of the rotary motion not interfere with the translation, the ratio between control current gains of the rotary motion is determined to satisfy $B_y=0$ in the right side of Equation (6), i.e., $i_{Kf}/i_{Kr} = K_{Ir}/K_{If}$.

By the above-described determination of the biasing current and the ratio between the control current gains, even if the values of the terms in the equation of translation change for correction of the displacement of the center of gravity, the coefficient of the translation component and the value C in the right side of the equation of rotary motion are both 0, and it never happens that the equation is not satisfied. Likewise, even if the values of the terms in the equation of rotary motion change for correction of the angle of displacement about the center of gravity, the coefficient of the rotational component and the value B in the right side of the equation of translation are both 0, and therefore, the equations of translation and those of rotary motion can completely independently be handled except for the term of the gyro effect. By doing so, no mutual interference between the translation and the rotary motion occurs, and the control can be performed with accuracy.

Figure 5:
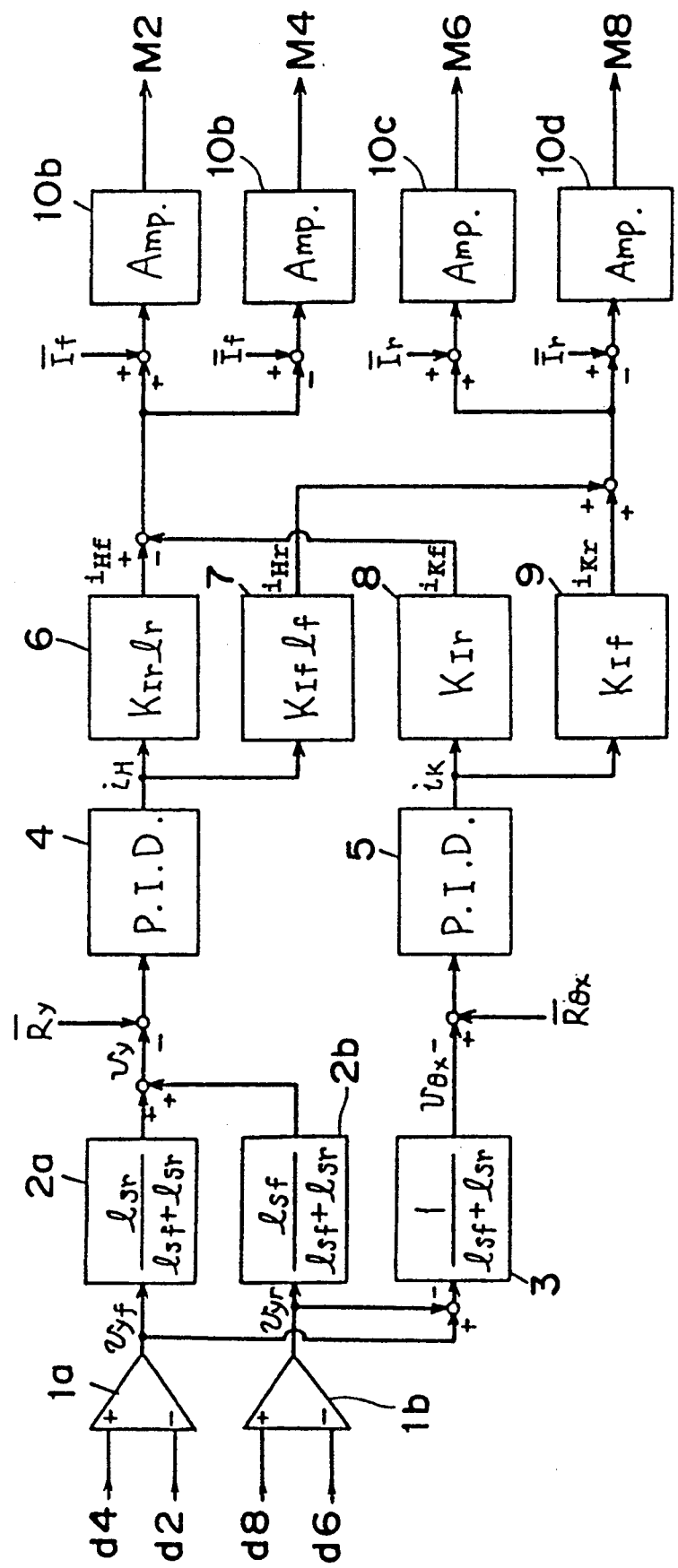
FIG. 5 is a block diagram of a control system according to the present invention.

FIG. 5 depicts a control system according to the present invention. In this system also, because the interference between the translation component x and the rotational component θy is equivalent to that between the translation component y and the rotational component θx, only the latter is discussed hereinafter for brevity's sake.

The system of FIG. 5 comprises two differential amplifiers 1a and 1b, two electric signal gains 2a and 2b coupled with respective differential amplifiers 1a and 1b, an electric signal gain 3 coupled with the two differential amplifiers 1a and 1b, a PID regulator 4 coupled with the two electric signal gains 2a and 2b, and a PID regulator 5 coupled with the electric signal gain 3. The system of FIG. 5 further comprises two electric signal gains 6 and 7 coupled with the PID regulator 4, two electric signal gains 8 and 9 coupled with the PID regulator 5, two amplifiers 10a and 10b coupled with the gains 6 and 8, and two amplifiers 10c and 10d coupled with the gains 7 and 9.

Figure 1:
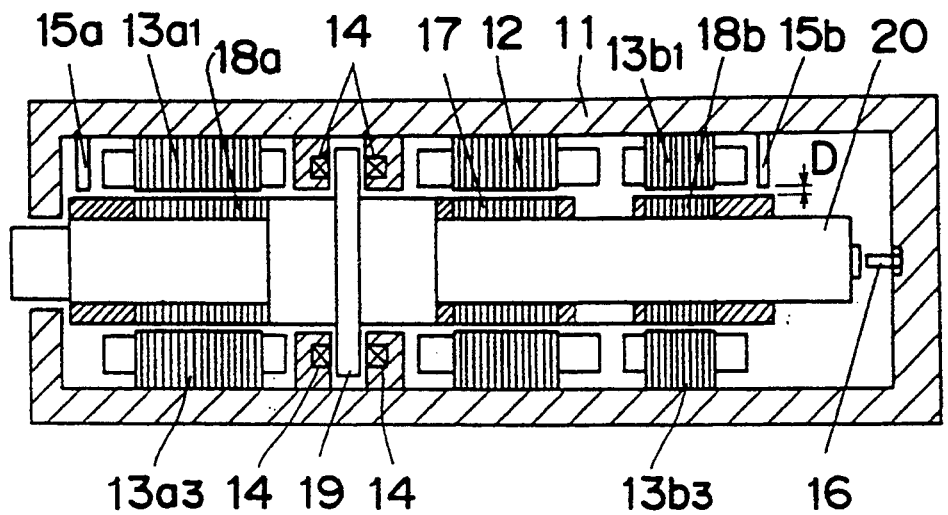
FIG. 1 is a cross-sectional view of a conventional magnetic bearing.
Figure 2:
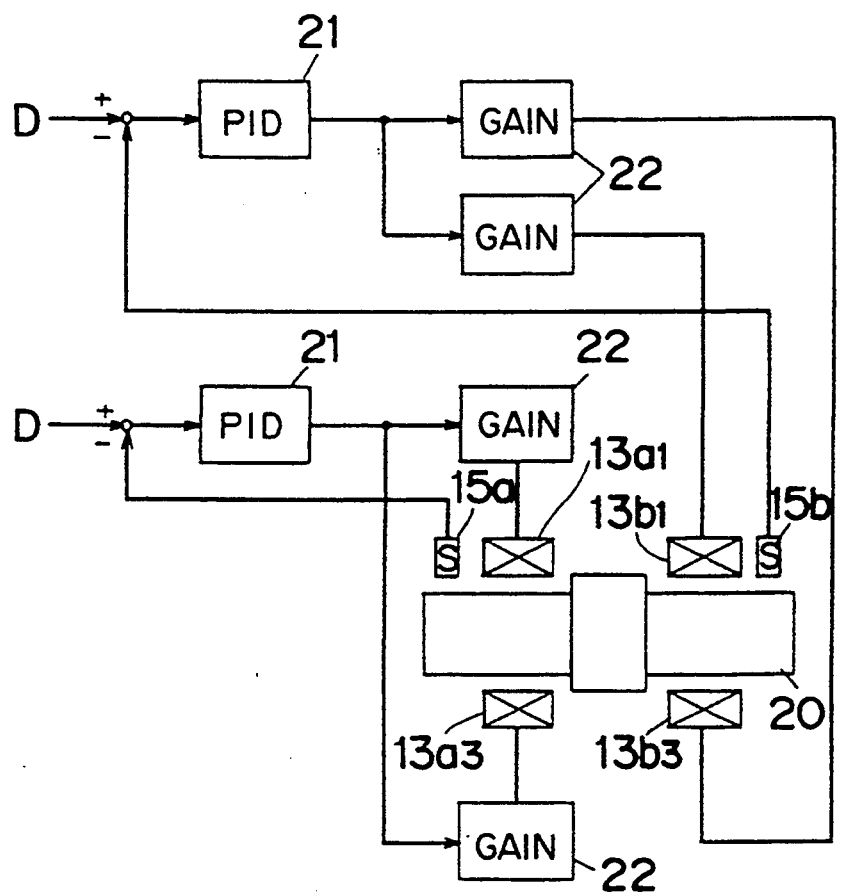
FIG. 2 is a block diagram of a conventional control system for controlling the position of the magnetic bearing of FIG. 1.
Figure 3:
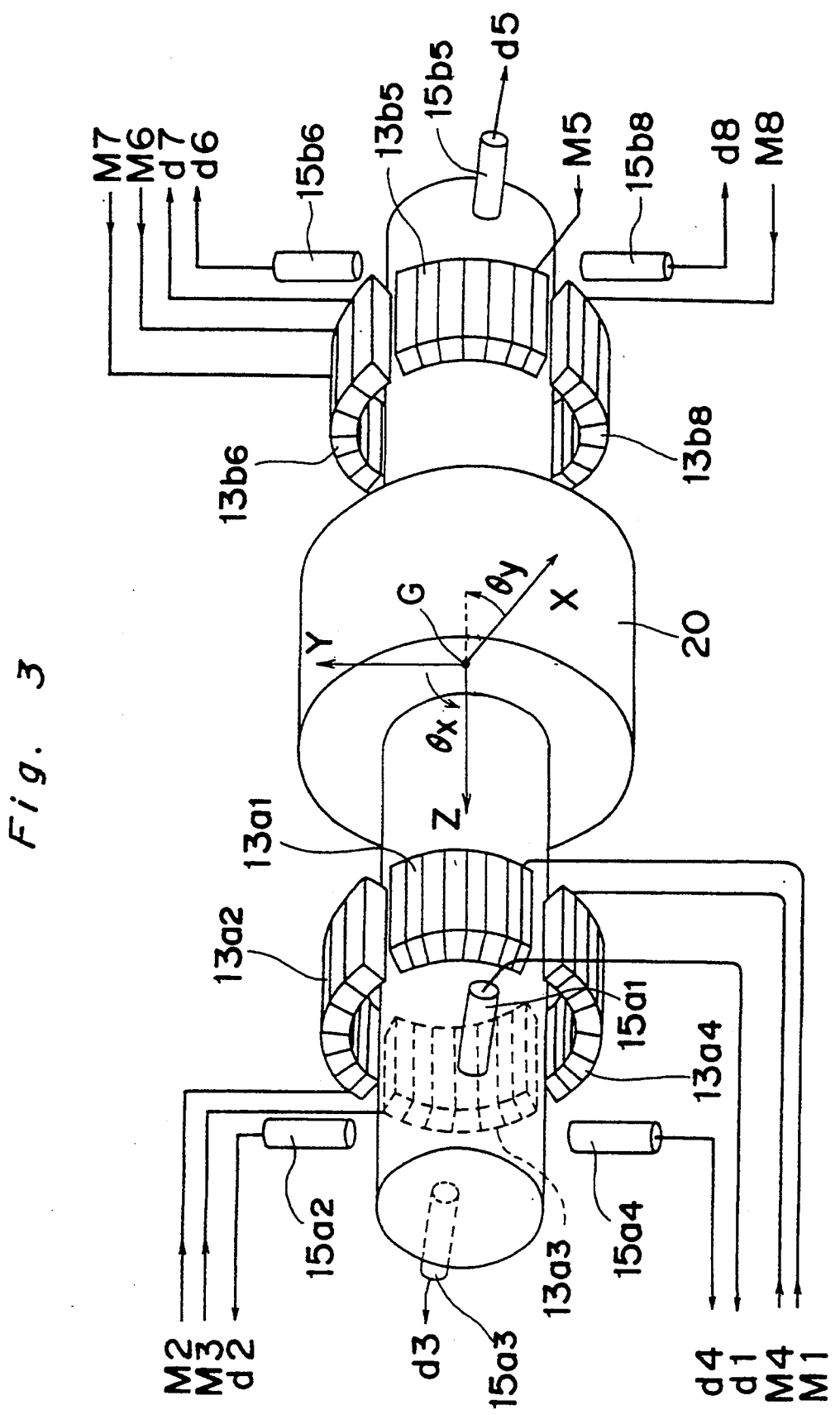
FIG. 3 is a perspective view of a rotary shaft to which the present invention is applied.

As shown in FIGS. 3 and 5, the two opposed front sensors 15a2 and 15a4 output respective displacement signals d2 and d4 to the differential amplifier 1a, whereas the two opposed rear sensors 15b6 and 15b8 output respective displacement signals d6 and d8 to the differential amplifier 1b. The displacement signals d2, d4, d6 and d8 are indicative of the radial position of the rotary shaft 20. The difference between the two input signals of each differential amplifier 1a (1b) is outputted therefrom as a voltage signal. When the distances between the center of gravity and the front and rear sensors are represented by $l_{sf}$ and $l_{sr}$, respectively, the two gains 2a and 2b (conversion sections) multiply the displacement signals $V_{yf}$ and $V_{yr}$ in the Y-direction of the rotary shaft 20 at the position of the front and rear sensors by distance ratios $l_{sr}/(l_{sf}+l_{sr})$ and $l_{sf}/(l_{sf}+l_{sr})$, respectively, to calculate a voltage value $v_y$ indicative of the translation displacement y of the center of gravity of the rotary shaft 20. The gain 3 finds the angle of displacement $v_{\theta x}$ about the center of gravity based on the difference $(v_{yf} - v_{yr})$ between the displacement signals $v_{yf}$ and $v_{yr}$ and the distance between the front and rear sensors $(l_{sf}+l_{sr})$. These values are compared with respective preset values $R_y$ and $R_{\theta x}$, respectively, and the differences therebetween are inputted to the PID regulators 4 and 5, respectively. The PID regulators 4 and 5 output control signal values $i_H$ and $i_K$ to the gains 6 and 7 and to the gains 8 and 9, respectively, and upon addition of a biasing current signal $\bar{I}$ thereto, control variables M2, M4, M6, and M8 are outputted from the amplifiers 10a, 10b, 10c, and 10d and are supplied to the electric magnets 13a2, 13a4, 13b6, and 13b8, respectively. No interference is caused by appropriately setting the biasing current values and the gain values determined in the conversion sections 6–9. In the conversion sections 6 and 7, the ratio $G_f/G_r$ between the front and rear gains is set to be equal to $K_{Ir}l_r/(K_{If}l_f)$ so that the control current $i_H$ of the translation may not interfere with the rotary motion. Likewise, in the conversion sections 8 and 9, the ratio $G_f/G_r$ between the front and rear gains is set to be equal to $K_{Ir}/K_{If}$ so that the control current $i_k$ of the rotary motion may not interfere with the translation. When the current I to be supplied to the electric magnets is prepared by adding $i_H$ or $i_K$ which has been set so as to satisfy the non-interference conditions, and by further adding the biasing current $\bar{I}$ steadily supplied thereto, the ratio between the front and rear biasing currents $\bar{I}$ is determined so as to satisfy $\bar{I}_f/\bar{I}_r = \{K_r l_r/(K_f l_f)\}^{\frac{1}{2}}$.

According to the present invention, by the appropriate determination of the biasing current ratio and the control current ratio between the front and rear electric magnets for establishment of the non-interference, Equations (4) and (5) become independent of each other, thereby preventing the mutual interference between the translation and the rotary motion of the rotary shaft. As a result, the position of the rotary shaft can be controlled with accuracy.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of controlling the position of a rotary shaft in a magnetic bearing, said method comprising the steps of:

supplying a first exciting current $I_f$ to a plurality of first electric magnets formed in the proximity of one end of the rotary shaft, said first exciting current $I_f$ being represented by the sum of a first biasing current $\bar{I}_f$, a first control current $i_{Hf}$ for translation, and a first control current $i_{Kf}$ for rotary motion;

supplying a second exciting current $I_r$ to a plurality of second electric magnets formed in the proximity of the other end of the rotary shaft, said second exciting current $I_r$ being represented by the sum of a second biasing current $\bar{I}_r$, a second control current $i_{Hr}$ for translation, and a second control current $i_{Kr}$ for rotary motion; and appropriately determining a ratio $\bar{I}_f/\bar{I}_r$ between said first and second biasing currents, a ratio $i_{Hf}/i_{Hr}$ between said first and second control currents for the translation, and a ratio $i_{Kf}/i_{Kr}$ between said first and second control currents for the rotary motion to prevent a mutual interference between the translation and the rotary motion of the rotary shaft.

2. The method according to claim 1, wherein said ratios $\bar{I}_f/\bar{I}_r$, $i_{Hf}/i_{Hr}$, and $i_{Kf}/i_{Kr}$ are determined to be $\bar{I}_f/\bar{I}_r = \{K_r l_r/(K_f l_f)\}^{\frac{1}{2}}$, $i_{Hf}/i_{Hr} = K_{Ir}l_r/(K_{If}l_f)$, and $i_{Kf}/i_{Kr} = K_{Ir}/(K_{If})$, respectively, where
   $K_f$: a constant determined by the property of said each first electric magnet,
   $K_r$: a constant determined by the property of said each second electric magnet,
   $l_f$: a distance between a center of gravity and said first electric magnets,
   $l_r$: a distance between the center of gravity and said second electric magnets,
   $K_{If}$: a constant determined by said $K_f$, said first exciting current, and a spacing between said each first electric magnet, and
   $K_{Ir}$: a constant determined by said $K_r$, said second exciting current, and a spacing between said each second electric magnet.

3. A method of controlling the position of a rotary shaft which can undergo translation motion and rotary motion in a magnetic bearing, said method comprising the steps of:

supplying a first exciting current to a plurality of first electric magnets formed in the proximity of one end of the rotary shaft, said first exciting current being represented by the sum of a first biasing current, a first control current for translation, and a first control current for rotary motion;

supplying a second exciting current to a plurality of second electric magnets formed in the proximity of the other end of the rotary shaft, said second exciting current being represented by the sum of a second biasing current, a second control current for translation, and a second control current for rotary motion; and controlling a mutual interference between the translation motion and the rotary motion of the rotary shaft by determining a first ratio between said first and second biasing currents, a second ratio between said first and second control currents for translation, and a third ratio between said first and second control currents for rotary motion so that said first exciting current and said second exciting current regulate the mutual interference between the translation motion and rotary motion of the rotary shaft.

4. The method according to claim 3, wherein said first, second and third ratios are determined to be $\{K_r l_r/(K_f l_f)\}^{\frac{1}{2}}$, $K_{Ir}l_r/(K_{If}l_f)$, and $K_{Ir}/(K_{If})$, resectively, where
   $K_f$: a constant determined by the property of said each first electric magnet,
   $K_r$: a constant determined by the property of said each second electric magnet,
   $l_f$: a distance between a center of gravity and said first electric magnets,
   $l_r$: a distance between the center of gravity and said second electric magnets,
   $K_{If}$: a constant determined by said $K_f$, said first exciting current, and a spacing between said each first electric magnet, and
   $K_{Ir}$: a constant determined by said $K_r$, said second exciting current, and a spacing between said each second electric magnet.

* * * * *

UNITED STATES PATENT AND TRADEMARK OFFICE
CERTIFICATE OF CORRECTION

PATENT NO. : 5,376,871
DATED : December 27, 1994
INVENTOR(S) : Takara et al.

It is certified that error appears in the above-identified patent and that said Letters Patent is hereby corrected as shown below:

Column 7, line 42, "$I_f$" should be --$\overline{I_f}$--.

Column 7, line 49, "$I_r$" should be --$\overline{I_r}$--.

Column 8, line 2, "$K_f$." should be --$K_f$:--.

Column 8, line 6, "$I_f$." should be --$I_f$:--.

Column 8, line 10, "$K_{If}$." should be --$K_{If}$:--.

Column 8, line 48, "$K_f$." should be --$K_f$:--.

Column 8, line 52, "$I_f$" should be --$I_f$--.

Column 8, line 56, "$K_{If}$." should be --$K_{If}$:--.

Signed and Sealed this

Twenty-fifth Day of April, 1995

Attest:

BRUCE LEHMAN

*Attesting Officer*   *Commissioner of Patents and Trademarks*